July 16, 1968  V. K. SWAMY  3,392,800
AIR SUPPORTED MATERIAL HANDLING DEVICE WITH
VIBRATION PREVENTING MEANS
Filed Oct. 23, 1965  2 Sheets-Sheet 1

INVENTOR
VENKAT K. SWAMY
BY *Robert H. Johnson*
ATTORNEY

July 16, 1968 V. K. SWAMY 3,392,800
AIR SUPPORTED MATERIAL HANDLING DEVICE WITH
VIBRATION PREVENTING MEANS
Filed Oct. 23, 1965 2 Sheets-Sheet 2
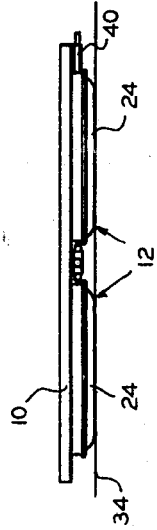
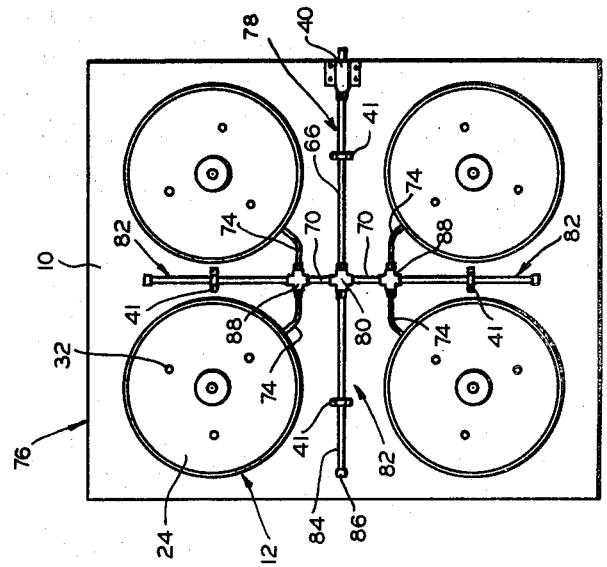
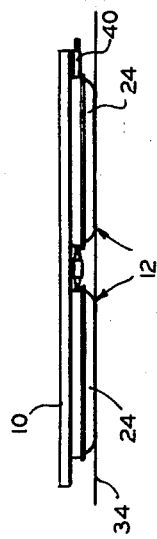
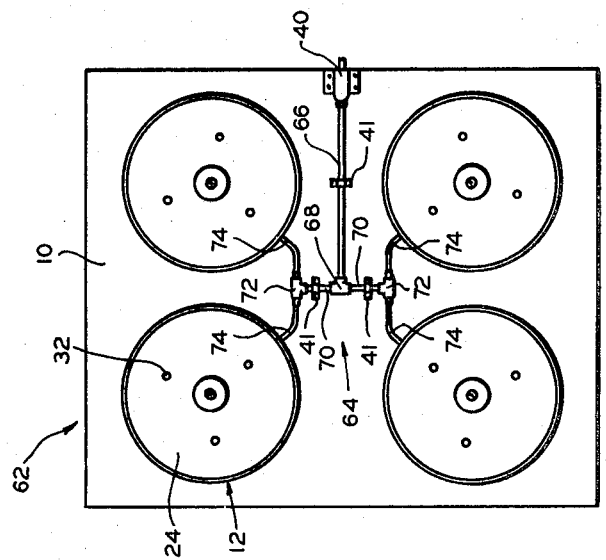
*INVENTOR*
VENKAT K. SWAMY
BY
ATTORNEY

# United States Patent Office 3,392,800
Patented July 16, 1968

3,392,800
AIR SUPPORTED MATERIAL HANDLING DEVICE
WITH VIBRATION PREVENTING MEANS
Venkat K. Swamy, Battle Creek, Mich., assignor to Clark
Equipment Company, a corporation of Michigan
Filed Oct. 23, 1965, Ser. No. 503,175
6 Claims. (Cl. 180—125)

ABSTRACT OF THE DISCLOSURE

A material handling device including a generally rectangular platform to which four symmetrically located inflatable air pads are attached. Air is supplied to the inflatable air pads by a central duct from which pairs of branch ducts lead to the individual air pads. Also connected to the main duct is an air chamber.

A principal object of my invention is to provide a material handling device in which there is an even distribution of air flow to all of the air pads associated therewith.

Another object of my invention is to provide a pallet supported by inflatable air pads which is very stable and does not have a tendency to vibrate or oscillate.

In carrying out my invention in one embodiment thereof I provide a platform to which four inflatable air pads are connected on the underside thereof. Pressurized air is supplied to the interior of each of the pads by a main supply conduit and feeder conduits which connect to each pad and intersect the main supply conduit at right angles therewith. An air chamber is connected to the main supply conduit and serves to provide an air cushion which prevents vibration or oscillation of the pallet.

In carrying out my invention in another embodiment thereof the air pads are supplied with pressurized air by a first conduit to which a second conduit is connected at right angles therewith, a feeder conduit being connected at either end of the second conduit and at right angles therewith and connected to different ones of the air pads.

In a modification of the second embodiment of my invention one or more air chambers are connected to the second conduit to form an air cushion.

Figure 1:
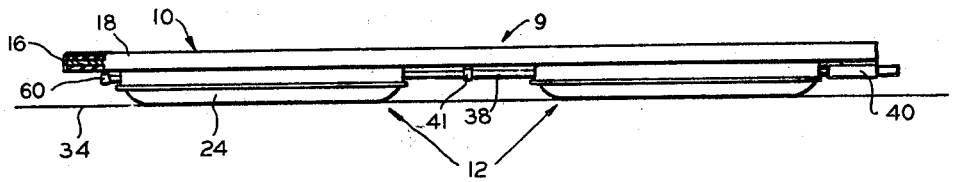
Figure 2:
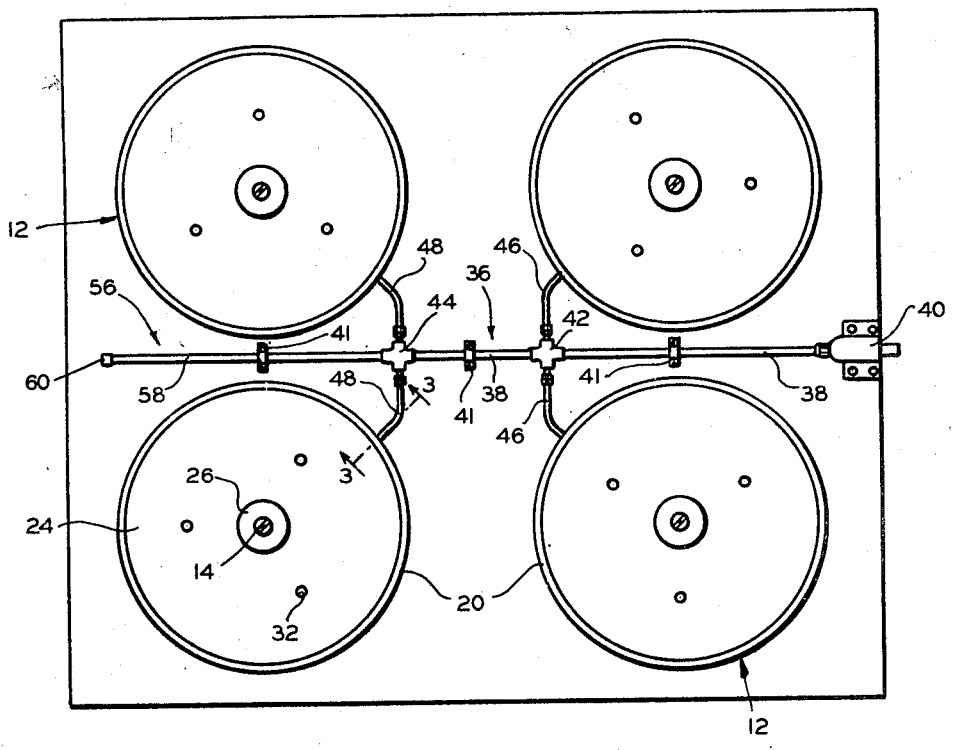
Figure 3:
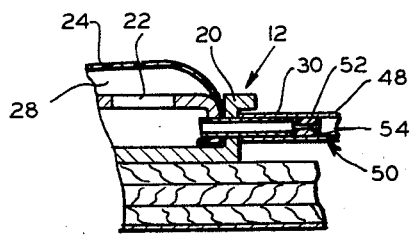

The above and other objects, features and advantages of my invention will become more readily apparent to one skilled in the art when the following detailed description is taken in conjunction with the following drawing wherein:

FIGURE 1 is a side elevation of a preferred embodiment of my invention with the air pads shown inflated, FIGURE 2 is a bottom view of the pallet shown in FIG. 1, FIGURE 3 is a fragmentary sectional view taken along the line 3—3 of FIG. 2, FIGURE 4 is a side elevational view of another embodiment of my invention, FIGURE 5 is a bottom view of the embodiment shown in FIG. 4, FIGURE 6 is a side elevational view of a modification of the embodiment shown in FIG. 4 and FIGURE 7 is a bottom view of the pallet shown in FIG. 6.

Referring now to FIGS. 1, 2 and 3, the reference numeral 9 denotes generally a pallet. Pallet 9 includes a platform to which four inflatable air pads 12 are attached by means of screws 14 extending through each pad centrally thereof and threadably engaging platform 10. Preferably platform 10 comprises a plywood core 16 covered by an aluminum skin 18. While platform 10 is shown to be generally rectangular in plan form, it need not be restricted to such shape, and may be substantially elongated, oval or circular, for example.

Each inflatable air pad 12 includes an annular outer frame member 20 which is somewhat dish shaped and an inner frame member 22 (FIG. 3). A flexible sheet 24 is held at the outer periphery thereof between the adjacent portions of frame members 20 and 22, as best seen in FIG. 3, and is attached to frame member 22 centrally thereof by screw 14 and a nylon disk 26. Sheet 24 forms with outer frame member 20 inflatable air chamber 28 to which pressurized air is supplied through an inlet port 30. Pressurized air directed into air chamber 28 through inlet port 30 causes air chamber 28 to inflate so that sheet 24 conforms generally to the configuration shown in FIG. 1. Pressurized air in chamber 28 is exhausted therefrom through a plurality of openings 32 in sheet 24, the air then flowing generally radially outwardly between the pad 12 and the supporting surface 34, forming an air film between supporting surface 34 and air pad 12. The provision of an air film between the air pads 12 and supporting surface 34 greatly reduces the coefficient of friction therebetween so that with very little effort pallet 9 may be moved omnidirectionally over supporting surface 34.

Pressurized air is supplied to pads 12 by means of a distribution system 36 which includes a main conduit 38 which has an inlet 40 at one end thereof adjacent one edge of platform 10. Inlet 40 preferably is one-half of a quick disconnect coupling so that an air line may be connected readily to pallet 9. Main conduit 38 is connected to platform 10 by a pair of brackets 41 fastened to the underside of platform 10 by any conventional means such as screws. Connected to main conduit 38 are a pair of cross connectors 42 and 44 which are spaced apart from each other, as shown in FIG. 2. A pair of feeder conduits 46 are connected to connector 42, each one of them connecting with the inlet port 30 of a different air pad 12. Similarly, a pair of feeder conduits 48 are connected to connector 44 at one end thereof and connected to the inlet port 30 of different ones of air pads 12 at the other end thereof. It will be noted that feeder conduits 46 are connected to connector 42 substantially opposite each other and at substantially right angles to conduit 38. Also, feeder conduits 48 are connected to connector 44 substantially opposite each other and at substantially right angles to conduit 38.

In the event that pallet 9 is used with a pressurized air source in which the pressure is above 10 p.s.i.g., then it is necessary to place an air flow restrictor 50 between the pressurized air source and the pads 12 so that the air pressure supplied to pads 12 is limited to 10 p.s.i.g. because pads 12 will rupture at higher pressures. I prefer to use a plug 52 which may be removably inserted in the feeder conduits and is normally held against the end of inlet port 30 by air pressure. Plug 52 has an opening 54 therethrough which serves to permit a restricted flow of pressurized air to pass from the feeder conduit into air pad 12. In the event that pallet 9 is to be used with a pressurized air source which provides pressurized air under 10 p.s.i.g., then flow restrictors 50 may be removed.

It will be noted that the connection of feeder conduits 46 to conduit 38 is spaced apart from the connection of feeder conduits 48 to conduit 38. This is important to insure that there is an even distribution of air flow to all of the pads. If the connections are placed too close together, then there is a greater air flow to the pads connected to feeder conduits 48 with the result that when pressurized air is initially supplied to pallet 9 the pads connected to feeder conduits 48 will inflate before the pads connected to feeder conduits 46, and further that the pads connected to feeder conduits 46 may not even inflate completely. I have found that in a pallet having a main conduit 38 with an inside diameter of one-half inch that uniform air flow to the various pads may be obtained by having the centers of connectors 42 and 44 spaced at least four inches apart. The air flow will be uniform for air pressures ranging from substantially zero to 100 p.s.i.g. and for air flows ranging from substantially zero to 53 c.f.m. While the distance between the centers of connectors 42 and 44 should be at least four inches, the centers of connectors of 42 and 44 may be spaced further apart, and, in fact, I prefer to have the centers spaced approximately nine inches apart.

Connected to connector 44 is an air chamber 56 which preferably is a piece of tubing 58 fastened to platform 10 by bracket 41. Tubing 58 is connected at one end to connector 44 and extends outwardly therefrom substantially coaxially with conduit 38 and is closed at the other end by a cap 60. Air chamber 56 serves as an air cushion and eliminates substantially all vibration or oscillation of pallet 9 which otherwise would be present when pressurized air is being supplied to the pallet and it is resting on a supporting surface. These vibrations which would otherwise be present except for the provision of air chamber 56 are severe enough so that a fragile load being carried on the pallet could be damaged. I have found that if air chamber 56 has an inside diameter of one-half inch and a length of 12 inches from the center of connection 44 that substantially all of the oscillation between pallet 9 and surface 34 is eliminated.

In order to enable persons skilled in the art to better understand my invention, I will now explain the operation of the preferred embodiment disclosed in FIGS. 1, 2 and 3. It will be assumed that pallet 9 is resting on a supporting surface 34 and that it is desired to move pallet 9 over the supporting surface. An air supply hose will be connected to inlet 40 and pressurized air then will be supplied to the fluid distribution system, including main conduit 38. Pressurized air then will be distributed equally to the four air pads so that they will inflate at the same time and to the same degree. Simultaneously, air chamber 56 will be providing an air cushion which eliminates any vibration or oscillation of pallet 9 on the supporting surface 34. Pallet 9 may now be slid omnidirectionally over the supporting surface with very little effort since the air film provided between pads 12 and supporting surface 34 greatly reduces the coefficient of friction therebetween.

Referring now to FIGS. 4 and 5, the reference numeral 62 denotes a pallet which is a second embodiment of my invention. Pallet 62 is similar in many respects to pallet 9, and so reference is made to the above-detailed description for a description of like parts to which like reference numerals have been applied.

Pressurized air is supplied to pads 12 by means of a fluid distribution system 64 which includes a main conduit 66 connected at one end to inlet 40. A T-shaped connector 68 is connected to main conduit 66 at the end opposite coupling 40 and has a pair of branch conduits 70 extending therefrom coaxially with each other and at substantially right angles to conduit 66. Connected to the end of each branch conduit 70 opposite connector 68 is a T-shaped connector 72. Connected to each connector 72 is a pair of feeder conduits 74 which are in turn connected to different ones of air pads 12. Feeder conduits 74 are connected to their respective connectors 72 substantially opposite each other and at substantially right angles to conduits 70.

In operation, pressurized air is supplied to coupling 40 and hence to pads 12 via conduits 66, 70 and 72. Because conduits 72 are disposed at substantially right angles to conduit 66, the pressurized air supplied to conduits 70 is divided substantially evenly therebetween, approximately one-half of the air flowing to one of the conduits 70 and approximately the other half flowing to the other of conduits 70. Then, because feeder conduits 74 are disposed at substantially right angles to the respective ones of conduits 70, the air flow through the respective conduits 70 is again divided substantially evenly between conduits 74 with the result that there is a substantially even air flow distribution to all of air pads 12. As a result all of pads 12 inflate at substantially the same time and to substantially the same degree.

Referring now to FIGS. 6 and 7, the reference numeral 76 denotes a pallet which is a modification of pallet 62 shown in FIGS. 4 and 5. Pallet 76 is very similar to pallet 62, and so reference is made to the detailed description of pallet 62 to the extent that it is relevant. Like reference numerals are utilized to indicate like parts.

The air distribution system 78 associated with pallet 76 includes a main conduit 66 connected to an inlet or one-half of a quick disconnect coupling 40. A cross connector 80 is connected to the end of main conduit 66 opposite inlet 40. A pair of branch conduits 70 are connected to connector 80 opposite each other and at substantially right angles to conduit 66. Also connected to cross connector 80 is an air chamber 82 which includes a length of tubing 84 which is connected at one end to connector 80 and extends substantially coaxially with conduit 68, the other end of tubing 84 being closed by a cap 86.

A cross connector 88 is connected to the end of each branch conduit 70 remote from connector 80. A pair of feeder conduits 74 are connected to each cross connector 88 and also are connected to different ones of air pads 12. Further, feeder conduits 74 are connected to cross connectors 88 substantially opposite each other and at substantially right angles to conduits 70. In addition, an air chamber 82 is connected to each cross connector 88 and extends substantially coaxially with conduits 70.

The operation of pallet 76 is substantially the same as the operation of pallet 62, except that the addition of air chambers 82 provides air cushions which eliminate any vibration and oscillation that might otherwise be present between pallet 76 and the supporting surface 34.

The above detailed description of my invention is intended to be illustrative only, and should not be considered as limiting. For example, the pallets have been described in conjunction with the use of pressurized air, but could be used with other pressurized fluids, for example. Further, no doubt other modifications, changes and substitutions which do not depart from the scope and spirit of my invention will occur to persons skilled in the art. Therefore, the limits of my invention should be determined from the following claims.

I claim:

1. An air film material handling device comprising a platform, a plurality of inflatable air pads mounted on the underside of the said platform, an air supply conduit mounted on the said platform, a plurality of feeder conduits, each of the said feeder conduits being connected to and in open communication with the said supply conduit and different ones of the said air pads, and air chambers means connected to and in open communication with the said supply conduit so that vertical oscillation of the device is dampened, said air chamber means having a closed outer end.

2. An air film material handling device as set forth in claim 1 wherein the said air chamber means includes a length of tubing, the said tubing being connected to and in open communication with the said supply conduit.

3. An air film material handling device as set forth in claim 1 wherein there are four feeder conduits, two of the said feeder conduits being connected to the said supply conduit opposite each other, the other two feeder conduits being connected to the said supply conduit opposite each other and spaced apart from the connection to the said supply conduit of the two feeder conduits mentioned first so that there is substantially even air distribution to all of the said air pads.

4. An air film material handling device as set forth in claim 3 wherein the said air chamber means includes a length of tubing, the said tubing being connected to and in open communication with the said supply conduit.

5. An air film material handling device as set forth in claim 3 wherein the said feeder conduits are connected to the said supply conduit at substantially right angles thereto.

6. An air film material handling device as set forth in claim 5 wherein the said air chamber means includes a length of tubing, the said tubing being connected to and in open communication with the said supply conduit.

References Cited

UNITED STATES PATENTS

| | | | |
|---|---|---|---|
| 3,185,238 | 5/1965 | Coates | 180—7 |
| 3,239,024 | 3/1966 | Christian | 180—7 |
| 3,251,432 | 5/1966 | Fischer et al. | 180—7 |
| 3,276,530 | 10/1966 | Borneman | 180—7 |

A. HARRY LEVY, *Primary Examiner.*